(12) United States Patent
Jang

(10) Patent No.: US 7,391,163 B2
(45) Date of Patent: Jun. 24, 2008

(54) APPARATUS OF DRIVING LIGHT SOURCE FOR DISPLAY DEVICE

(75) Inventor: Hyeon-Yong Jang, Osan (KR)

(73) Assignee: Samsung Electronics Co., Ltd. (KR)

( * ) Notice: Subject to any disclaimer, the term of this patent is extended or adjusted under 35 U.S.C. 154(b) by 249 days.

(21) Appl. No.: 10/546,929

(22) PCT Filed: Aug. 8, 2003

(86) PCT No.: PCT/KR03/01598

§ 371 (c)(1),
(2), (4) Date: Aug. 26, 2005

(87) PCT Pub. No.: WO2004/077893

PCT Pub. Date: Sep. 10, 2004

(65) Prior Publication Data

US 2006/0158132 A1 Jul. 20, 2006

(30) Foreign Application Priority Data

Feb. 28, 2003 (KR) .................. 10-2003-0012680

(51) Int. Cl.
*H05B 37/02* (2006.01)
(52) U.S. Cl. .................. 315/219; 315/226; 315/308; 315/DIG. 4
(58) Field of Classification Search ............. 315/209 R, 315/219, 224, 225, 226, 307, 308, DIG. 4
See application file for complete search history.

(56) References Cited

U.S. PATENT DOCUMENTS

| | | | | |
|---|---|---|---|---|
| 4,251,752 A * | 2/1981 | Stolz | .......... | 315/206 |
| 5,466,992 A | 11/1995 | Nemirow et al. | ............ | 315/276 |
| 5,742,497 A * | 4/1998 | Hashimoto et al. | .......... | 363/133 |
| 5,784,268 A * | 7/1998 | Steffek et al. | .................. | 363/55 |
| 5,822,201 A | 10/1998 | Kijima | ........................ | 363/25 |
| 5,930,121 A | 7/1999 | Henry | ........................ | 363/16 |
| 6,046,549 A * | 4/2000 | James | ........................ | 315/291 |
| 6,356,035 B1 | 3/2002 | Weng | ..................... | 315/209 R |
| 2001/0024379 A1 | 9/2001 | Suzuki | ........................ | 363/131 |
| 2002/0140538 A1 | 10/2002 | Yer et al. | ..................... | 336/198 |

FOREIGN PATENT DOCUMENTS

| | | |
|---|---|---|
| JP | 07-045378 | 2/1995 |
| JP | 08-111289 | 4/1996 |
| JP | 08-251945 | 9/1996 |

(Continued)

*Primary Examiner*—Thuy Vinh Tran
(74) *Attorney, Agent, or Firm*—F. Chau & Assoc., LLC

(57) ABSTRACT

An apparatus of driving a lamp for a display device is provided. The driving apparatus includes an inverter (920), a lamp current sensor (940), and an inverter controller (930). The lamp current sensor (940) senses a current flowing in the lamp and output a feedback signal having a magnitude depending on the sensed current. The inverter controller (930) compares a dimming control signal from an external device with the feedback signal and controls the inverter (920) based on the comparison. The inverter (920) includes a transformer (T1) for applying a lamp drive voltage to a lamp for turning on or off the lamp and a voltage sensor (928) sensing the lamp drive voltage. The inverter (920) adjusts a turns ratio of the transformer in accordance with the sensed lamp drive voltage.

10 Claims, 6 Drawing Sheets

FOREIGN PATENT DOCUMENTS

| | | |
|---|---|---|
| JP | 08-293389 | 11/1996 |
| JP | 08-339892 | 12/1996 |
| JP | 10-116694 | 5/1998 |
| JP | 11-167994 | 6/1999 |
| JP | 2001-267156 | 9/2001 |
| JP | 2002-299089 | 10/2002 |
| KR | 200229092 | 7/2001 |
| KR | 20020058300 | 7/2002 |
| KR | 20020065206 | 8/2002 |
| KR | 20020076417 | 10/2002 |
| KR | 20020076895 | 10/2002 |

* cited by examiner

APPARATUS OF DRIVING LIGHT SOURCE FOR DISPLAY DEVICE

BACKGROUND OF THE INVENTION (a) Field of the Invention

The present invention relates to an apparatus of driving light source for a display device such as a liquid crystal display.

(b) Description of the Related Art

Display devices used for monitors of computers and television sets include self-emitting displays such as light emitting diodes (LEDs), electroluminescences (ELs), vacuum fluorescent displays (VFDs), field emission displays (FEDs) and plasma panel displays (PDPs) and non-emitting displays such liquid crystal displays (LCDs) requiring light source.

An LCD includes two panels provided with field-generating electrodes and a liquid crystal (LC) layer with dielectric anisotropy interposed therebetween. The field-generating electrodes supplied with electric voltages generate electric field in the liquid crystal layer, and the transmittance of light passing through the panels varies depending on the strength of the applied field, which can be controlled by the applied voltages. Accordingly, desired images are obtained by adjusting the applied voltages.

The light may be emitted from a light source equipped in the LCD or may be natural light When using the equipped light source, the total brightness of the LCD screen is usually adjusted by regulating the ratio of on and off times of the light source or regulating the current through the light source.

A light device for an LCD, i.e., a backlight unit usually includes a plurality of fluorescent lamps as a light source and an inverter for driving the lamps, which includes a transformer with a boosting voltage typically determined based on the turns ratio. The inverter converts a DC (direct current) input voltage from an external device into an AC (alternating current) voltage, and then applies the voltage boosted by the transformer to the lamps to turn on the lamps and to control the brightness of the lamps in response to a luminance control signal. Furthermore, the inverter detects a voltage related to a total current flowing in the lamps and controls the voltage applied to the lamps on the basis of the detected voltage.

Since the lamp of the backlight unit is supplied with a high voltage for stable lighting operation in case of initiation or under a low temperature, the turns ratio of the transformer is set to be high to generate the high voltage.

However, since the initiation or the low temperature condition is maintained for a very short time, the lamp is not required to be supplied with such a high voltage for most time. That is, after a short-time application of the high voltage to the lamp for an initiating operation or a low temperature lighting operation, a low voltage is sufficient for driving the lamp.

In a typical backlight unit, the design of the inverter of the backlight unit focuses on the initiating condition or the low temperature condition rather than a normally operating state after ignition of the lamp. For this purpose, the ratio of the transformer is set to be high, which continuously applies high voltage to the lamp even in the stabilized state to cause unnecessary power consumption and decrease in operation efficiency.

Particularly, the efficient power consumption is very important for a device with a battery having a limited capacity such as a portable computer.

SUMMARY OF THE INVENTION

A motivation of the present invention is to improve the power efficiency of a light device.

An apparatus of driving a lamp for a display device is provided, the apparatus includes: an inverter including a transformer for applying a lamp drive voltage to a lamp for turning on or off the lamp and a voltage sensor sensing the lamp drive voltage; a lamp current sensor sensing a current flowing in the lamp and output a feedback signal having a magnitude depending on the sensed current; and an inverter controller comparing a dimming control signal from an external device with the feedback signal and controlling the inverter based on the comparison, wherein the inverter adjusts a turns ratio of the transformer in accordance with the sensed lamp drive voltage.

It is preferable that the turns ratio of the transformer is adjusted to a first value when the sensed lamp drive voltage is higher than a predetermined voltage, and to a second value lower than the first value when the sensed lamp drive voltage is less than the predetermined voltage.

The inverter controller operates depending on an enable signal having a plurality of states from an external device, the inverter further comprises a differential circuit supplied with the enable signal, and the turns ratio of the transformer has the first value when the enable signal is in the first state.

The inverter may further includes: a driving operation selector having an output value in accordance with outputs of the inverter controller and the differential circuit; a driving unit adjusting the turns ratio of the transformer based on the outputs of the driving operation selector and the inverter controller; and a voltage divider connected between the transformer and the voltage sensor, and making an output voltage of the transformer resonate and dividing the output voltage.

The inverter controller may output a first signal and a second signal, and the driving operation selector may include: a first OR gate supplied with the first output signal of the inverter controller; a second OR gate supplied with the first output signal of the inverter controller and the output of the differential circuit; a first AND gate supplied with the second output signal of the inverter controller and the output of the differential circuit; a second AND gate supplied with the second output signal of the inverter controller; and an inverter receiving the output of the differential circuit, and generating an output signal to be applied to the first OR gate and the second AND gate.

The inverter controller may further outputs a third signal and a fourth signal, the transformer includes a primary coil having an input terminal and first and second terminals and a secondary coil, and the driving unit includes: a first driving circuit supplied with the third and fourth output signals of the inverter controller and generating an output signal to be applied to the input terminal of the primary coil of the transformer; a second driving circuit supplied with the outputs from the first OR gate and the first AND gate and generating an output signal to be applied to the first output terminal of the primary coil of the transformer; and a third driving circuit supplied with the outputs from the second OR gate and the second AND gate and generating an output signal to be applied to the second output terminal of the primary coil of the transformer.

The number of turns for the first output terminal of the transformer is less than the number of turns for the second output terminal of the transformer.

Preferably, the driving operation selector makes the second driving circuit select the first output terminal of the transformer to be activated when the sensed lamp drive voltage is higher than the predetermined voltage, and makes the third driving circuit select the second output terminal of the transformer to be activated when the sensed lamp drive voltage sensor is smaller than the predetermined voltage.

The voltage divider may include first and second capacitors connected in series between the transformer and a ground voltage, and a common terminal of the first and the second capacitors is preferably connected to the voltage sensor.

The voltage sensor may include: a diode having an anode connected to the common terminal of the first and the second capacitors and a cathode connected to the differential circuit; a resistor connected between the cathode of the diode and a ground; and a capacitor connected between the cathode of the diode and the ground.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
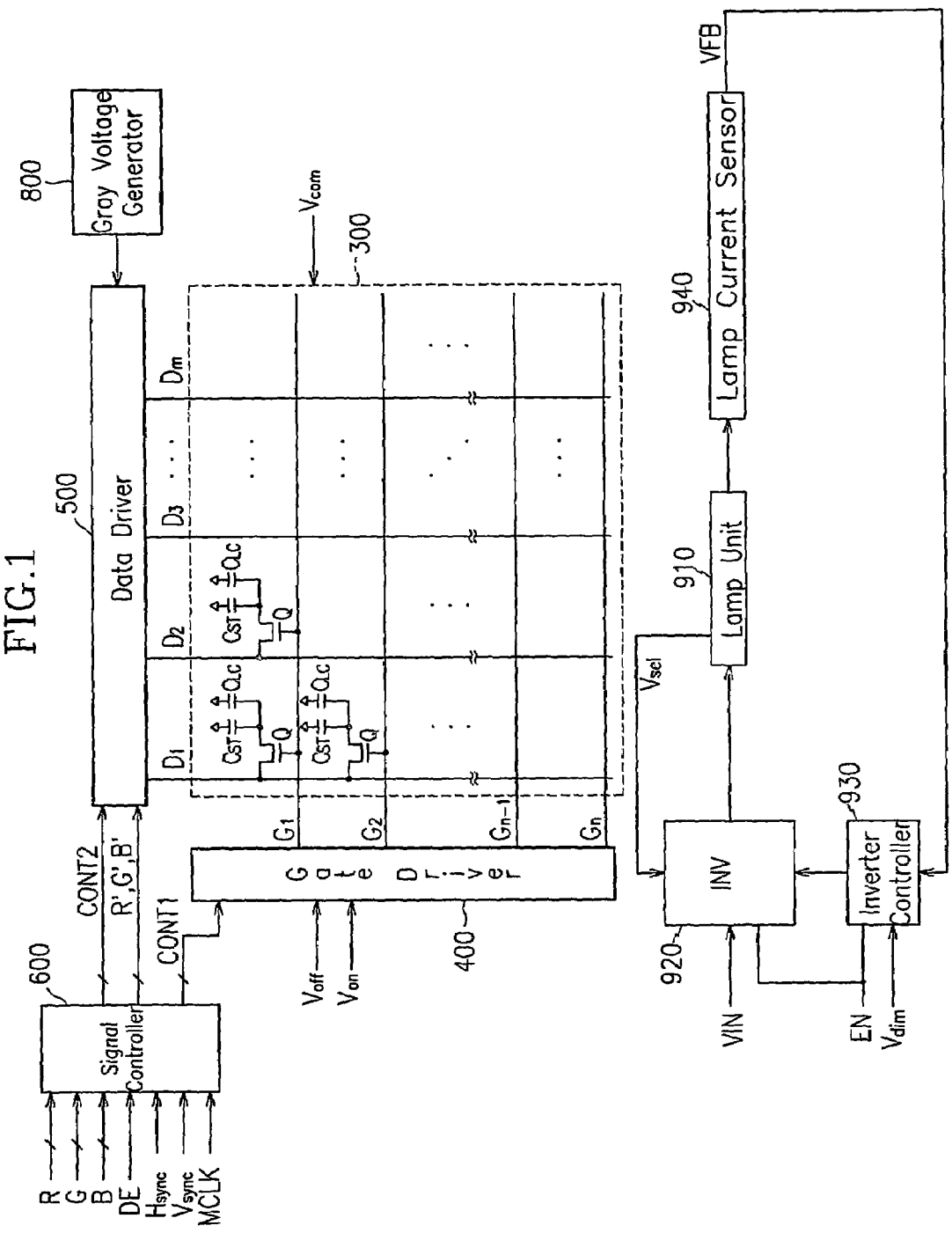
FIG. 1 is a block diagram of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout It will be understood that when an element such as a layer, region or substrate is referred to as being "on" another element, it can be directly on the other element or intervening elements may also be present In contrast, when an element is referred to as being "directly on" another element, there are no intervening elements present.

Then, liquid crystal displays according to embodiments of the present invention will be described with reference to the drawings.

Figure 2:
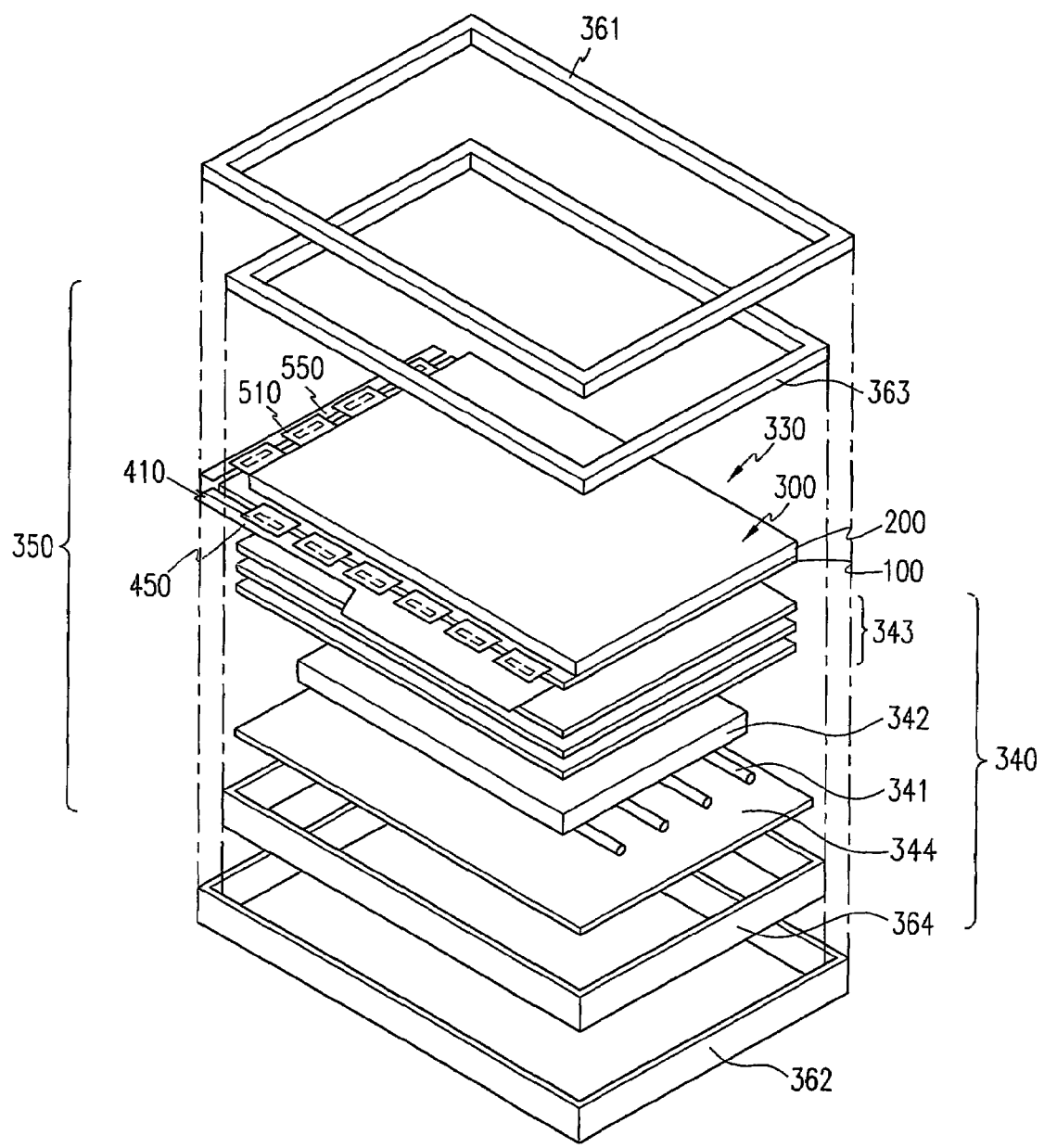
FIG. 2 is an exploded perspective view of an LCD according to an embodiment of the present invention.
Figure 3:
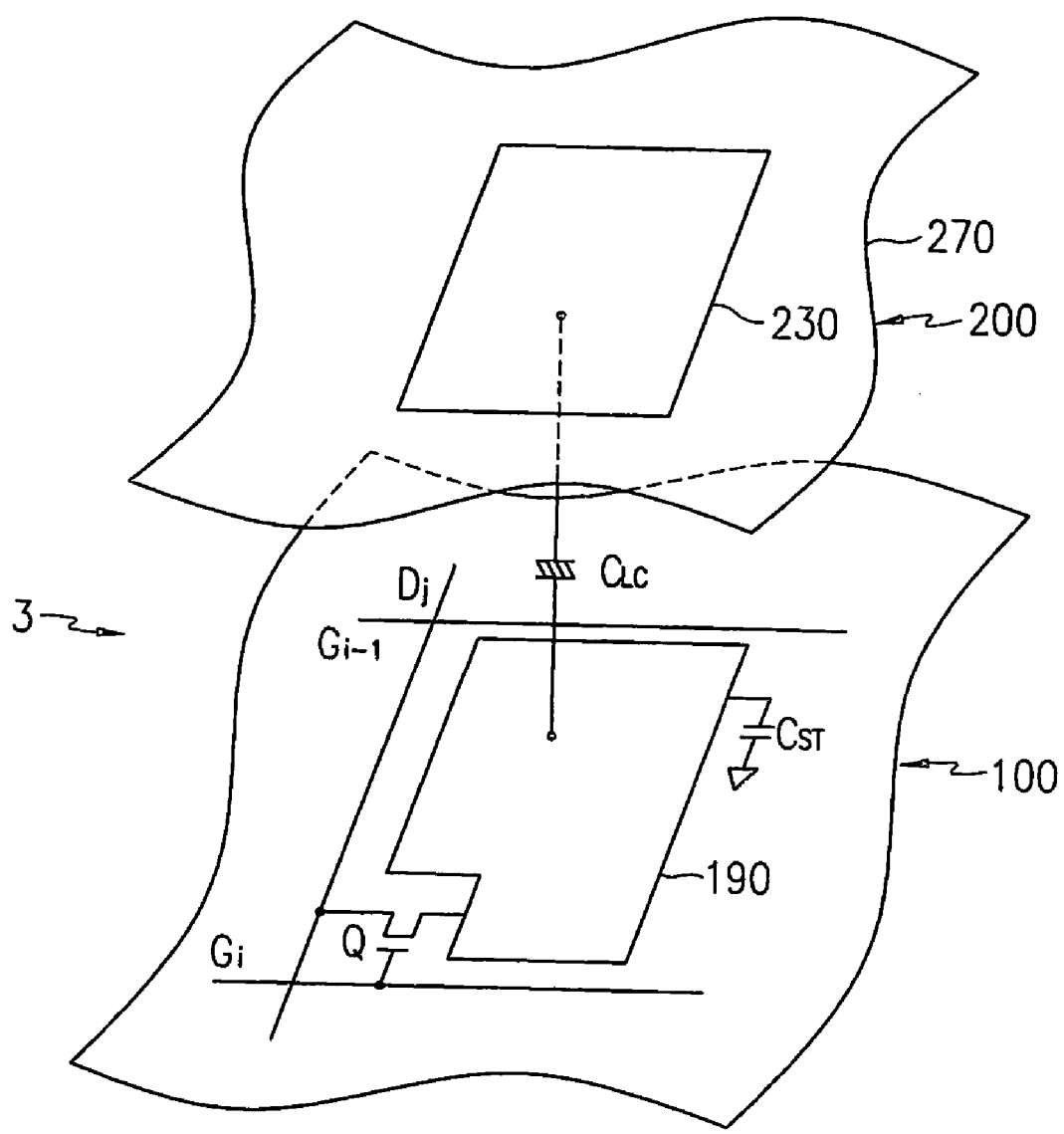
FIG. 3 is an equivalent circuit diagram of a pixel of an LCD according to an embodiment of the present invention.

FIG. 1 is a block diagram of an LCD according to an embodiment of the present invention, FIG. 2 is an exploded perspective view of an LCD according to an embodiment of the present invention, and FIG. 3 is an equivalent circuit diagram of a pixel of an LCD according to an embodiment of the present invention.

Referring to FIG. 1, an LCD according to an embodiment of the present invention includes a LC panel assembly 300, a gate driver 400 and a data driver 500 which are connected to the panel assembly 300, a gray voltage generator 800 connected to the data driver 500, a lamp unit 910 for illuminating the panel assembly 300, an inverter 920 connected to the lamp unit 910, a lamp current sensor 940 connected to the lamp unit 910, a inverter controller 930 connected to the lamp current sensor 940 and the inverter 920, and a signal controller 600 controlling the above elements.

In structural view, the LCD according to an embodiment of the present invention includes a LC module 350 including a display unit 330 and a backlight unit 340, and a pair of front and rear cases 361 and 362 containing the LC module 350 as shown in FIG. 2.

The display unit 330 includes the LC panel assembly 300, a plurality of gate flexible printed circuit (FPC) films 410 and a plurality of data FPC films 510 attached to the LC panel assembly 300, and a gate printed circuit board (PCB) 450 and a data PCB 550 attached to the associated FPC films 410 and 510, respectively.

The LC panel assembly 300, in structural view shown in FIGS. 2 and 3, includes a lower panel 100, an upper panel 200 and a liquid crystal layer 3 interposed therebetween while it includes a plurality of display signal lines $G_1$-$G_n$ and $D_1$-$D_m$ and a plurality of pixels connected thereto and arranged substantially in a matrix in circuital view shown in FIGS. 1 and 3.

The display signal lines $G_1$-$G_n$ and $D_1$-$D_m$ are provided on the lower panel 100 and include a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q connected to the display signal lines $G_1$-$G_n$ and $D_1$-$D_m$, and an LC capacitor $C_{LC}$ and a storage capacitor $C_{ST}$ that are connected to the switching element Q. The storage capacitor $C_{ST}$ may be omitted if unnecessary.

The switching element Q such as a TFT is provided on the lower panel 100 and has three terminals: a control terminal connected to one of the gate lines $G_1$-$G_n$; an input terminal connected to one of the data lines $D_1$-$D_m$; and an output terminal connected to the LC capacitor $C_{LC}$ and the storage capacitor $C_{ST}$.

The LC capacitor $C_{LC}$ includes a pixel electrode 190 on the lower panel 100, a common electrode 270 on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel represent its own color by providing one of a plurality of red, green and blue color filters 230 in an area occupied by the pixel electrode 190. The color filter 230 shown in FIG. 3 is provided in the corresponding area of the upper panel 200. Alternatively, the color filter 230 is provided on or under the pixel electrode 190 on the lower panel 100.

Referring to FIG. 2, the backlight unit 340 includes 340 includes a plurality of lamps 341 disposed behind the LC panel assembly 300, a light guide 342 and a plurality of optical sheets 343 disposed between the panel assembly 300 and the lamps 341 and guiding and diffusing light from the lamps 341 to the panel assembly 300, and a reflector 344 disposed under the lamps 341 and reflecting the light from the lamps 341 toward the panel assembly 300.

The lamps 341 preferably include fluorescent lamps such as CCFL (cold cathode fluorescent lamp) and EEFL (external electrode fluorescent lamp). An LED is another example of the lamp 341.

The inverter 920, the lamp current sensor 940, and the inverter controller 930 may be mounted on a stand-alone inverter PCB (not shown) or mounted on the gate PCB 450 or the data PCB 550.

A pair of polarizers (not shown) polarizing the light from the lamps 341 are attached on the outer surfaces of the panels 100 and 200 of the panel assembly 300.

Referring to FIGS. 1 and 2, the gray voltage generator 800 generates two sets of a plurality of gray voltages related to the transmittance of the pixels and is provided on the data PCB 550. The gray voltages in one set have a positive polarity with respect to the common voltage Vcom, while those in the other set have a negative polarity with respect to the common voltage Vcom.

The gate driver 400 preferably includes a plurality of integrated circuit (IC) chips mounted on the respective gate FPC films 410. The gate driver 400 is connected to the gate lines $G_1$-$G_n$ of the panel assembly 300 and synthesizes the gate-on voltage Von and the gate off voltage Voff from the driving voltage generator 700 to generate gate signals for application to the gate lines $G_1$-$G_n$.

The data driver 500 preferably includes a plurality of IC chips mounted on the respective data FPC films 510. The data driver 500 is connected to the data lines $D_1$-$D_m$ of the panel assembly 300 and applies data voltages selected from the gray voltages supplied from the gray voltage generator 800 to the data lines $D_1$-$D_m$.

According to another embodiment of the present invention, the IC chips of the gate driver 400 and/or the data driver 500 are mounted on the lower panel 100, while one or both of the drivers 400 and 500 are incorporated along with other elements into the lower panel 100 according to still another embodiment. The gate PCB 450 and/or the gate FPC films 410 may be omitted in both cases.

The signal controller 600 controlling the drivers 400 and 500, etc. is provided on the data PCB 550 or the gate PCB 450.

Now, the operation of the LCD will be described in detail.

The signal controller 600 is supplied with RGB image signals R, G and B and input control signals controlling the display thereof such as a vertical synchronization signal Vsync, a horizontal synchronization signal Hsync, a main clock MCLK, and a data enable signal DE, from an external graphic controller (not shown). After generating gate control signals CONT1 and data control signals CONT2 and processing the image signals R, G and B suitable for the operation of the panel assembly 300 on the basis of the input control signals and the input image signals R, G and B, the signal controller 600 provides the gate control signals CONT1 for the gate driver 400, and the processed image signals R', G' and B' and the data control signals CONT2 for the data driver 500.

The gate control signals CONT1 include a vertical synchronization start signal STV for informing of start of a frame, a gate clock signal CPV for controlling the output time of the gate-on voltage Von, and an output enable signal OE for defining the width of the gate-on voltage Von. The data control signals CONT2 include a horizontal synchronization start signal STH for informing of start of a horizontal period, a load signal LOAD or TP for instructing to apply the appropriate data voltages to the data lines $D_1$-$D_m$, an inversion control signal RVS for reversing the polarity of the data voltages (with respect to the common voltage Vcom) and a data clock signal HCLK.

The data driver 500 receives a packet of the image data R', G' and B' for a pixel row from the signal controller 600 and converts the image data R', G' and B' into the analogue data voltages selected from the gray voltages supplied from the gray voltage generator 800 in response to the data control signals CONT2 from the signal controller 600.

Responsive to the gate control signals CONT1 from the signals controller 600, the gate driver 400 applies the gate-on voltage Von to the gate line $G_1$-$G_n$, thereby turning on the switching elements Q connected thereto.

The data driver 500 applies the data voltages to the corresponding data lines $D_1$-$D_m$ for a turn-on time of the switching elements Q (which is called "one horizontal period" or "1H" and equals to one periods of the horizontal synchronization signal Hsync, the data enable signal DE, and the gate clock signal CPV). Then, the data voltages in turn are supplied to the corresponding pixels via the turned-on switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure, all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages in one packet are reversed (which is called "dot inversion").

The inverter 920 converts a DC voltage VIN into an AC voltage, boosts the AC voltage and applies the boosted AC voltage to the lamp unit 910 in response to an inverter control signal from the inverter controller 930.

The lamp current sensor 940 senses a current flowing into the lamp unit 940 to provide a voltage related to the sensed current as a feedback signal VFB for the inverter controller 930.

The inverter controller 930 starts operation thereof upon application of an enable signal EN from an external device for controlling the inverter 920. The inverter controller 930 compares the feedback signal VFB from the lamp current sensor 940 with a dimming control voltage $V_{dim}$, and, based on the comparison result, supplies pulse-width-modulated (PWMed) control signals for controlling the inverter 920 to the inverter 920. At this time, when the feedback signal VFB is less than the dimming control voltage $V_{dim}$, the inverter controller 930 increases the pulse width of the control signals for applying higher voltage to the lamp unit 910. On the contrary, when the feedback signal VFB is higher than the dimming control voltage $V_{dim}$, the inverter controller 930 decreases the pulse width of the control signals for applying lower voltage to the lamp unit 910. Accordingly, the current flowing in the lamp unit 910 is always uniform.

The dimming control voltage $V_{dim}$ may be directly inputted from a separate input device which is adjustable by a user, or from the signal controller 600. In addition, the enable signal EN for starting the backlight unit may be supplied from a separate control device provided on an external device.

Then, the operations of the inverter controller 930 and the inverter 920 will be described in detail with reference to FIGS. 4 to 6. Although one lamp is shown for descriptive purpose, but a plurality of lamps connected in parallel may be provided.

Figure 4:
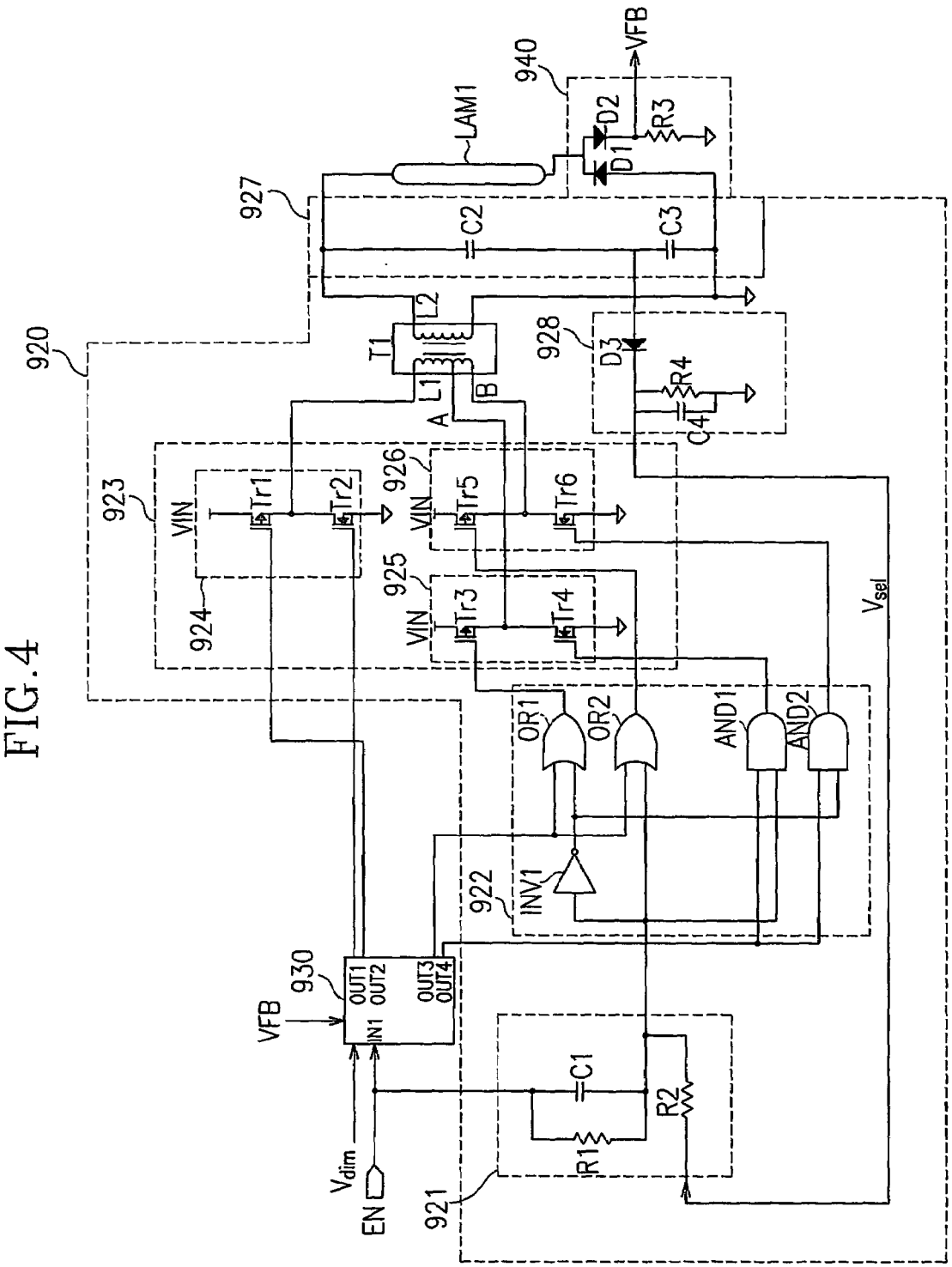
FIG. 4 is a circuit diagram of an inverter according to an embodiment of the present invention.
Figure 5A:
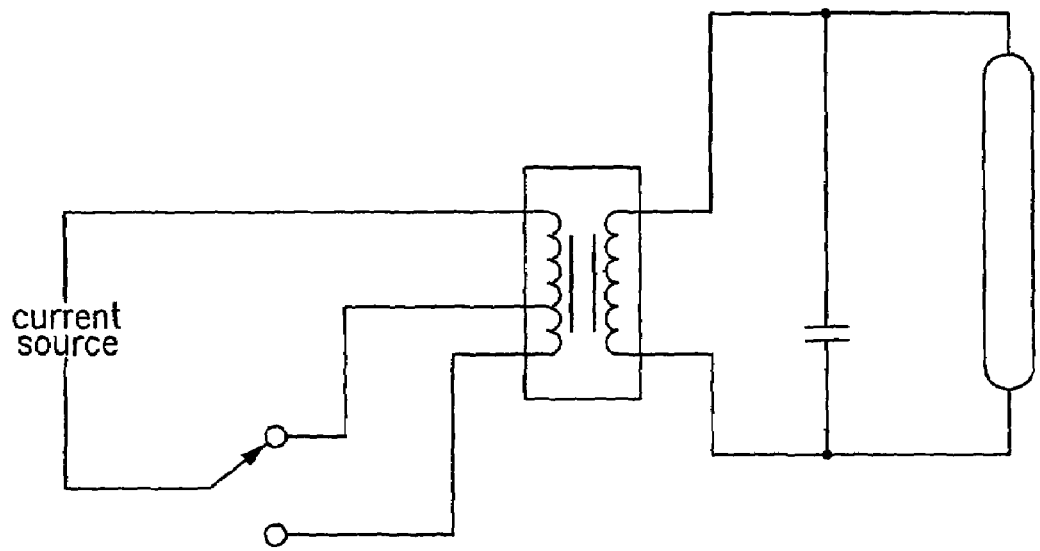
FIGS. 5A and 5B are equivalent circuit diagrams of the inverter shown in FIG. 4 when sensed voltages are high and low, respectively.
Figure 5B:
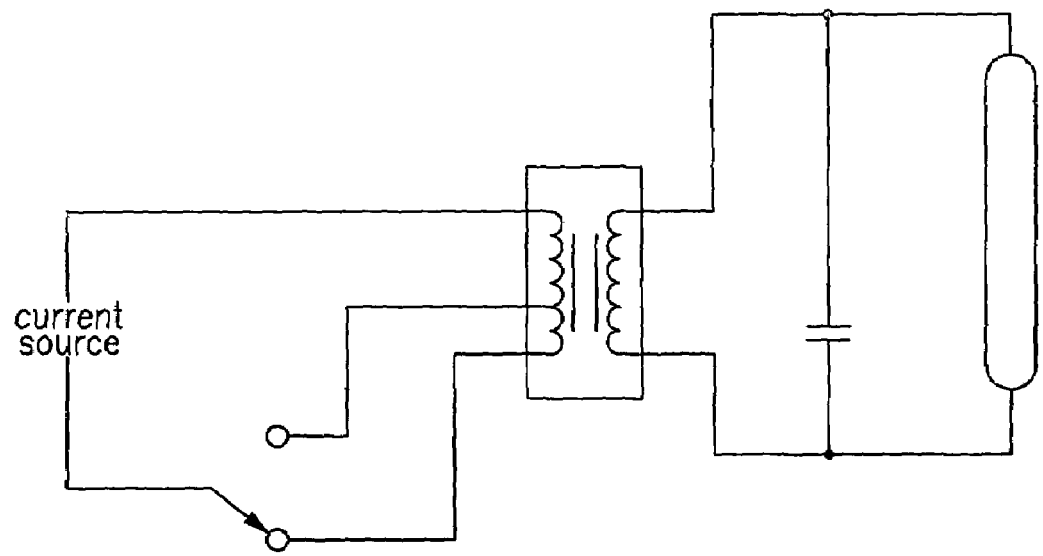

FIG. 4 is a circuit diagram of an inverter according to an embodiment of the present invention. FIGS. 5A and 5B are equivalent circuit diagrams of the driving apparatus when sensed voltages are high and low, respectively, and FIG. 6 is a graph showing a sensed voltage as function of time according to an embodiment of the present invention.

As shown in FIG. 4, an inverter 920 according to an embodiment of the present invention includes a delay unit 921 receiving an enable signal EN, a driving operation selector 922 connected to the inverter controller 930, a driving unit 923 connected to the inverter controller 930 and the driving operation selector 922, a transformer T1 connected to the driving unit 923, a voltage divider 927 connected to the transformer T1, and a voltage sensor 928 connected between the voltage divider 927 and the delay unit 921.

The delay unit 921 includes a combination of a resistor R1 and a capacitor C connected in parallel and a resistor R2 connected thereto. The combination of a resistor R1 and a capacitor C receives the enable signal while the resistor R2 is supplied with a driving operation select signal $V_{sel}$ from the voltage sensor 928. The output terminal of the delay unit 921 is a node between the resistors R1 and R2.

The driving operation selector 922 includes a plurality of logic gates, one inverter INV1, two OR gates OR1 and OR2, and two AND gates AND1 and AND2. An input of the inverter INV1 is the output of the delay unit 921. Two inputs of the OR gate OR1 are connected to an output terminal OUT3 of the inverter controller 930 and an output terminal of the inverter INV1, while two inputs of the OR gate OR2 are connected to an output terminal OUT3 of the inverter controller 930 and the output terminal of the delay unit 921. Two inputs of the AND gate AND1 are connected to an output terminal OUT1 of the inverter controller 930 and the output terminal of the delay unit 921, while two inputs of the AND gate AND 2 are connected to an output terminal OUT4 of the inverter controller 930 and the output terminal of the inverter INV1.

The driving unit 923 includes a plurality of current drive units 924-926. Each current drive unit 924-926 has a pair of transistors Tr1 and Tr2, Tr3 and TR4, or Tr5 and Tr6 connected in series between a supply voltage VIN and a ground voltage, and the nodes between the transistors Tr1 and Tr2, Tr3 and TR4, and Tr5 and Tr6 are output terminals of the respective current drive units 924-926.

Gates of the transistors Tr1 and Tr2 of the current drive unit 924 are connected to the output terminals OUT1 and OUT2 of the inverter controller 930, respectively, gates of the transistors Tr3 and Tr4 of the current drive unit 925 are connected to the output terminals of the OR gate OR1 and the AND gate AND1 of the driving operation selector 922, respectively, and gates of the transistors Tr5 and Tr6 of the current drive unit 926 are connected to the output terminals of the OR gate OR2 and the AND gate AND2 of the driving operation selector 922, respectively.

The output terminals of the current drive units 924-926 are connected to an input terminal, a first output terminal A, and a second output terminal B of a primary coil L1 of the transformer T1, respectively.

The voltage divider 927 includes a pair of capacitors C2 and C3 connected in series. The capacitors C2 and C3 are connected across a secondary coil L2 of the transformer T1. The capacitor C3 is grounded.

The voltage sensor 928 includes a diode D3 connected from a common terminal of the capacitors C2 and C3 in a forward direction, and a resistor R4 and a capacitor C4 connected in parallel between an output terminal of the diode D3 and the ground voltage. An output of the diode D3 is applied as the drive select signal $V_{sel}$ to the delay unit 921.

The first output terminal A of the primary coil L1 of the transformer T1 has the turns number less than that of the second output terminal B of the primary coil L1, and the secondary coil L2 of the transformer T2 is connected across the lamp LAM1 of the lamp unit 10.

According to an embodiment of the present invention, the transistors Tr1-Tr6 of the current drive unit 924 to 926 are metal oxide semiconductor field effect transistors (MOSFET). The transistors Tr1, Tr3 and Tr5 among them are p-channel transistors, while the remainder transistors Tr2, Tr4 and Tr6 are n-channel transistors However, types of the transistors may be changed.

The lamp current sensor 940 includes a pair of diodes D2 and D3, and a resistor R3. The diodes D2 and D3 are connected from the lamp LAM1 in a forward direction and in a reverse direction, respectively, and the resistor R3 is connected between the diode D2 and the ground voltage. The feedback control signal VFB is outputted from a common terminal of the diode D2 and the resistor R3.

The operations of the inverter 920 will be described in detail.

For stating the backlight device, when the enable signal EN applied to the delay unit 921 and the inverter controller 930 is changed from a low state into a high state, the inverter controller 930 outputs control signals with appropriate states via the output terminals OUT1 to OUT4 to operate the inverter 920. That is, the inverter controller 930 supplies a signal in a high state and a signal in a low state for the gates of the transistors Tr1 and Tr2 of the current drive unit 924 through the output terminals OUT1 and OUT2 thereof, respectively, to turn on the transistors Tr1 and Tr2.

In addition, the inverter controller 930 supplies a signal in a low state for the OR gates OR1 and OR2 through the output terminal OUT3 thereof and a signal in a high state for one terminals of the AND gates AND1 and AND2 through the output terminal OUT4 thereof, respectively.

The enable signal in the high state is applied to the delay unit 921. Then, since the resistor R1 and the capacitor C1 of the delay unit 921 function as a differential circuit outputting a high-level signal when the enable signal EN is changed from the low state into the high state, the OR gate OR1 and the AND gate AND2 of the driving operation selector 922 receive high inputs. Furthermore, because an input into the inverter INV1 is in the high state, the inverter INV1 outputs low-level signal to be input into the OR gate OR1 and the AND gate AND2.

Because the outputs from the OR gate OR1 and the AND gate AND1 of the driving operation selector 922 are in the low state and in the high state, respectively, the transistors Tr3 and Tr4 of the current drive unit 925 are turned on. However, because the outputs from the OR gate OR2 and the AND gate AND2 of the driving operation selector 922 are high and low, respectively, the transistors Tr5 and Tr6 of the current drive unit 926 are turned off.

By the operations of the current drive units 925 and 926, the input terminal and the output terminal A1 of the primary coil L1 of the transformer T1 are selected to form an equivalent circuit as shown in FIG. 5A. The transformer T1 transforms an alternating voltage applied to the primary coil L1 and applies the transformed alternating voltage to the voltage divider 927, based on the turns ratio of the transformer T1 defined by the selection of the input terminal and the first output terminal A.

Because the number of turns for the first output terminal A is less than that for the second output terminal B, the applied voltage for the selection of the first output terminal A is higher than that for the selection of the second output terminal B. The transformed high voltage resonates and is divided by the voltage divider 927.

The transformed high voltage is applied to the lamp LAM1 to turn on the lamp LAM1, and is divided to be applied to the voltage sensor 928.

By an operation characteristic of the lamp LAM 1, when a current flows through the lamp LAM1 after ignition of the lamp LAM1, the temperature of the lamp LAM1 increases, and thus the impedance of the lamp LAM1 decreases. Since the inverter controller 930 controls the inverter 920 to apply a uniform current to the lamp LAM1 by using the feedback signal VFB from the lamp current sensor 940 and the dimming control signal $V_{dim}$ the magnitude of the driving operation select signal $V_{sel}$ from the voltage sensor 928 is gradually decreased with time as the temperature of the lamp LAM1 increases.

When the magnitude of the driving operation select signal $V_{sel}$ applied to the delay unit 921 is less than about a half of the supply voltage VIN, the driving operation selector 922 determines the driving operation select signal $V_{sel}$ in a low state and vice versa. For example, in a case that the supply voltage VIN is 5V, the driving operation select signal $V_{sel}$ is determined to be high when its magnitude is higher than 2.5V while it is determined to be low when its magnitude is less than 2.5V.

Figure 6:
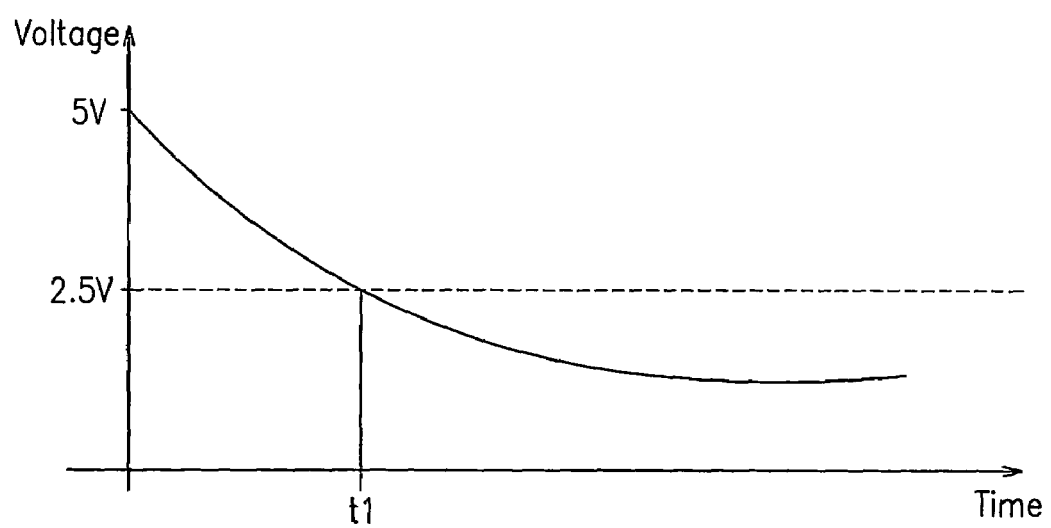
FIG. 6 is a graph illustrating a sensed voltage as function of time according to an embodiment of the present invention.

According to the operation characteristic, the magnitude of the driving operation select signal $V_{sel}$ from the voltage sensor 928 is gradually decreased with time as shown in FIG. 6, to reach 2.5V at a time t1. Accordingly, the output signals of the OR gate OR1 and the AND gate AND1 are changed into the high state and the low state, respectively, and the output signals of the OR gate OR2 and the AND gate AND2 are changed into the low state and the high state, respectively. Thus, the transistors Tr3 and Tr4 of the current drive unit 925 are turned off, while the transistors Tr5 and Tr6 of the current drive unit 926 are turned on, and thus the input terminal and the second output terminal B are selected. An equivalent circuit thereof is shown in FIG. 5B. That is, the output terminal of the primary coil L1 is changed from the first output terminal A into the second output terminal B.

The transformer T1 transforms the alternating voltage applied to the primary coil L1 in accordance with the turns ratio of the transformer T1 defined by the selection of the input terminal and the second output terminal B and applies the transformed alternating voltage to the voltage divider 927.

As above described, because the number of turns for the first output terminal A of the primary coil L1 is less than that for the second output terminal B of the primary coil L1, the turns ratio of the transformer T1 is less than the ratio defined on the initiating condition. Thus, the transformed alternating voltage applied to the lamp LAM1 is decreased.

The operations of the inverter controller 930 and the inverter 920 are performed along with the feedback control operation of the inverter 920 using the feedback control signal VFB from the lamp current sensor 940 and the dimming control voltage $V_{dim}$. That is, a voltage corresponding to a current rectified by the diode D2 is applied as the feedback control signal VFB to the inverter controller 930. Then, the inverter controller 930 compares the driving operation select signal $V_{sel}$ with the feedback control signal VPB, and the pulse widths of the control signals applied to the driving operation selector 922 and the driving unit 923 are adjusted based on the difference of the signals $V_{sel}$ and VFB such that the uniform current is flowing in the lamp LAM1.

According to an embodiment of the present invention, the voltage across the lamp LAM1 is sensed and the turns ratio of the transformer T1 is changed according to the sensed voltage to adjust the transformed alternating voltage from the transformer T1. The turns ratio of the transformer T1 is increased under the initiating condition or the low temperature condition, while it is decreased when the lamp is stabilized, thereby improving power efficiency of the backlight unit.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An apparatus of driving a lamp for a display device, the apparatus comprising:
    an inverter including a transformer for applying a lamp drive voltage to a lamp for turning on or off the lamp and a voltage sensor sensing the lamp drive voltage;
    a lamp current sensor sensing a current flowing in the lamp and output a feedback signal having a magnitude depending on the sensed current; and
    an inverter controller comparing a dimming control signal from an external device with the feedback signal and controlling the inverter based on the comparison,
    wherein the inverter adjusts a turns ratio of the transformer in accordance with the sensed lamp drive voltage.

2. The apparatus of claim 1, wherein the turns ratio of the transformer is adjusted to a first value when the sensed lamp drive voltage is higher than a predetermined voltage, and to a second value lower than the first value when the sensed lamp drive voltage is less than the predetermined voltage.

3. The apparatus of claim of 1, wherein the inverter controller operates depending on an enable signal having a plurality of states from an external device, the inverter further comprises a differential circuit supplied with the enable signal, and the turns ratio of the transformer has the first value when the enable signal is in the first state.

4. The apparatus of claim 3, wherein the inverter further comprises:
    a driving operation selector having an output value in accordance with outputs of the inverter controller and the differential circuit,
    a driving unit adjusting the turns ratio of the transformer based on the outputs of the driving operation selector and the inverter controller; and
    a voltage divider connected between the transformer and the voltage sensor, and making an output voltage of the transformer resonate and dividing the output voltage.

5. The apparatus of claim 4, wherein the inverter controller outputs a first signal and a second signal, and
the driving operation selector comprises:
a first OR gate supplied with the first output signal of the inverter controller;
a second OR gate supplied with the first output signal of the inverter controller and the output of the differential circuit;
a first AND gate supplied with the second output signal of the inverter controller and the output of the differential circuit;
a second AND gate supplied with the second output signal of the inverter controller; and
an inverter receiving the output of the differential circuit, and generating an output signal to be applied to the first OR gate and the second AND gate.

6. The apparatus of claim 5, wherein the inverter controller further outputs a third signal and a fourth signal, the transformer includes a primary coil having an input terminal and first and second terminals and a secondary coil, and the driving unit comprises:
a first driving circuit supplied with the third and fourth output signals of the inverter controller and generating an output signal to be applied to the input terminal of the primary coil of the transformer;
a second driving circuit supplied with the outputs from the first OR gate and the first AND gate and generating an output signal to be applied to the first output terminal of the primary coil of the transformer; and
a third driving circuit supplied with the outputs from the second OR gate and the second AND gate and generating an output signal to be applied to the second output terminal of the primary coil of the transformer.

7. The apparatus of claim 6, wherein the number of turns for the first output terminal of the transformer is less than the number of turns for the second output terminal of the transformer.

8. The apparatus of claim 6, wherein the driving operation selector makes the second driving circuit select the first output terminal of the transformer to be activated when the sensed lamp drive voltage is higher than the predetermined voltage, and makes the third driving circuit select the second output terminal of the transformer to be activated when the sensed lamp drive voltage sensor is smaller than the predetermined voltage.

9. The apparatus of claim 4, wherein the voltage divider includes first and second capacitors connected in series between the transformer and a ground voltage, and a common terminal of the first and the second capacitors is connected to the voltage sensor.

10. The apparatus of claim 9, wherein the voltage sensor comprises:
a diode having an anode connected to the common terminal of the first and the second capacitors and a cathode connected to the differential circuit;
a resistor connected between the cathode of the diode and a ground; and
a capacitor connected between the cathode of the diode and the ground.

* * * * *